Patented June 16, 1931

1,810,839

UNITED STATES PATENT OFFICE

CARL METTLER, OF BASEL, SWITZERLAND, ASSIGNOR TO THE FIRM OF J. R. GEIGY S. A., OF BASEL, SWITZERLAND

MANUFACTURE OF DIRECT DYEING DISAZO-DYESTUFFS

No Drawing. Application filed October 23, 1929, Serial No. 401,978, and in Germany November 15, 1928.

3:3'-diamino-4:4'-dihydroxy-diphenylsulphone has hitherto not been used in the dyestuff industry, notwithstanding that the parent materials therefor, for instance 4:4'-dihydroxy-diphenylsulphone and 3:3'-dinitro-4:4'-dihydroxydiphenylsulphone, are easily accessible (Annalen der Chemie, vol. 147, page 59, vol. 172, page 50; Berichte der deutschen chemischen Gesellschaft, vol. 40, page 644, and vol 8, page 1060).

According to this invention, 3:3'-diamino-4:4'-dihydroxydiphenylsulphone as such is tetrazotized and coupled with two molecular proportions of an arylated 2-amino-5-naphthol-7-sulphonic acid to produce disazo-dyestuffs which, when dyed on cotton with addition of metal salts, such as for example copper sulphate, yield violet dyeings of an excellent fastness to light, high colour strength and good fastness to washing. Under an alkylated 2-amino-5-naphthol-7-sulphonic acid there is to be understood a phenyl- or substituted phenyl-2-amino-5-naphthol-7-sulphonic acid.

Instead of 3:3'-diamino-4:4'-dihydroxydiphenylsulphone as such there may also be used substitution products thereof, in which there are contained in the nucleus one or more methyl-groups or halogen atoms. By coupling such substitution products with arylated 2-amino-5-naphthol-7-sulphonic acids, dyestuffs of similar properties are obtained.

The following examples illustrate the invention, the parts being by weight:—

Example 1

28 parts of 3:3'-diamino-4:4'-dihydroxydiphenylsulphone of the formula

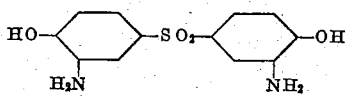

are tetrazotized in presence of ice by means of hydrochloric acid and 14 parts of sodium nitrite and the tetrazo-product is coupled with 64 parts of phenyl-2-amino-5-naphthol-7-sulphonic acid in a solution alkaline with sodium carbonate. After stirring for 24 hours, heating and salting out, there is obtained a dyestuff which, when dry, is a dark bronze powder, freely soluble in water to a blue-violet solution and soluble in concentrated sulphuric acid to a red-violet solution. The disazodyestuff obtained has the following formula:

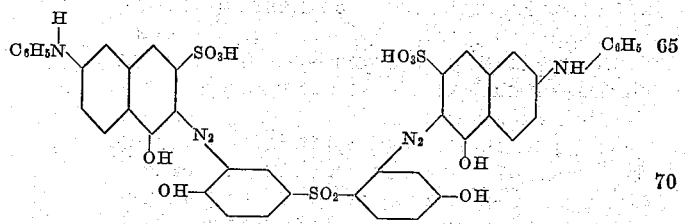

It dyes cotton directly Bordeaux rose tints, becoming violet on treatment with copper sulphate. In order to exhaust the dyebath it is advantageous to dye together with copper sulphate. The dyeing is of good colour strength, very fast to light and of good fastness to washing.

It is also possible to vary the working so as to obtain directly the copper salt of the dyestuff in pure and finished form and to then use same for dyeing with addition of soda.

Analogous dyestuffs are obtained when there is substituted for the phenyl-2-amino-5-naphthol-7-sulphonic acid, the ortho-, meta- and para-tolyl-2-amino-5-naphthol-7-sulphonic acid, or the para-salicyl-2-amino-5-naphthol-7-sulphonic acid, or the para-anisyl-2-amino-5-naphthol-7-sulphonic acid. In the last-named case, cotton is dyed bluish violet.

Example 2

In the Chemischen Zentralblatt 1912, vol. 2, page 251, there is described a dinitro-ortho-oxytolylsulphone which is to be regarded as 3:3'-dinitro-4:4'-dihydroxy-5:5'-dimethyl-diphenylsulphone of the formula:

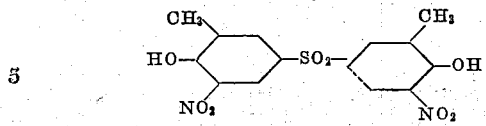

By reducing this compound, there is easily obtained a solution of 3:3'-diamino-4:4'-dihydroxy-5:5'-dimethyl-diphenylsulphone, which is tetrazotized as described in Example 1 and coupled with phenyl-2-amino-5-naphthol-7-sulphonic acid. The disazo-dyestuff thus obtained has the formula:

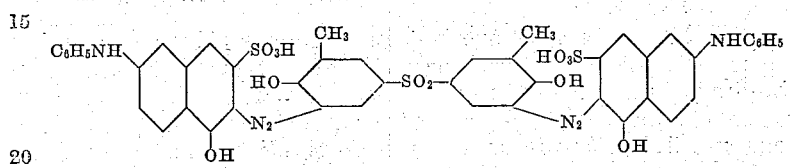

and is a dark bronze powder which dissolves freely in water to a blue violet solution and in sulphuric acid to a red violet solution. With copper sulphate on cotton it dyes violet tints of great colour strength, of excellent fastness to light and good fastness to washing.

In this example, the 3:3'-diamino-4:4'-dihydroxy-5:5'-dimethyl-diphenylsulphone can be replaced by the corresponding nuclear chloro- or halogen substitution product.

What I claim is:—

1. A process for the manufacture of direct dyeing disazo-dyestuffs, consisting in tetrazotizing 3:3'-diamino-4:4'-dihydroxy-diphenylsulphones and coupling the tetrazo-product with two molecular proportions of arylated 2-amino-5-naphthol-7-sulphonic acids.

2. A process for the manufacture of direct dyeing disazo-dyestuffs, consisting in tetrazotizing 3:3'-diamino-4:4'-dihydroxy-diphenylsulphones having a nuclear methyl substituent and coupling the tetrazo-product with two molecular proportions of arylated 2-amino-5-naphthol-7-sulphonic acids.

3. As new articles of manufacture, the direct dyeing disazo-dyestuffs obtained by tetrazotizing 3:3'-diamino-4:4'-dihydroxy-diphenylsulphones and coupling the tetrazo-product with two molecular proportions of arylated 2-amino-5-naphthol-7-sulphonic acids, said dyestuffs being soluble in water to a blue-violet and in sulphuric acid to a red-violet coloration and dyeing cotton directly with copper sulphate violet tints of good colour strength, very fast to light and of good fastness to washing.

In witness whereof I have hereunto signed my name this 7th day of October, 1929.

CARL METTLER.